(12) United States Patent
Kim et al.

(10) Patent No.: US 10,752,109 B2
(45) Date of Patent: Aug. 25, 2020

(54) STRUCTURE OF FUEL FILLER DOOR FOR VEHICLE

(71) Applicant: Sinjin Plastics Co., Ltd, Incheon (KR)

(72) Inventors: Jaehun Kim, Incheon (KR); Byungsang Kim, Incheon (KR)

(73) Assignee: Sinjin Plastics Co., Ltd., Incheon (KR)

( * ) Notice: Subject to any disclaimer, the term of this patent is extended or adjusted under 35 U.S.C. 154(b) by 0 days.

(21) Appl. No.: 16/265,616

(22) Filed: Feb. 1, 2019

(65) Prior Publication Data

US 2019/0241066 A1 Aug. 8, 2019

(30) Foreign Application Priority Data

Feb. 5, 2018 (KR) .................. 10-2018-0013832

(51) Int. Cl.
*B60K 15/05* (2006.01)
*E05D 3/02* (2006.01)

(52) U.S. Cl.
CPC ........ *B60K 15/05* (2013.01); *B60K 2015/053* (2013.01); *B60K 2015/0561* (2013.01); *B60K 2015/0576* (2013.01); *E05D 3/02* (2013.01); *E05Y 2900/534* (2013.01)

(58) Field of Classification Search
CPC .. B60K 15/05; B60K 15/053; E05Y 2900/534
USPC .................................................. 296/97.22
See application file for complete search history.

(56) References Cited

U.S. PATENT DOCUMENTS

| 7,380,861 B2* | 6/2008 | Engel | B60K 15/05 |
| | | | 296/97.22 |
| 8,870,582 B2* | 10/2014 | Yamamaru | B60K 1/04 |
| | | | 439/135 |
| 9,539,896 B2* | 1/2017 | Jones | B60K 15/05 |

FOREIGN PATENT DOCUMENTS

| JP | 2007-269258 A | 10/2007 |
| JP | 2015-202802 A | 11/2015 |
| KR | 10-2006-0062390 A | 6/2006 |
| KR | 10-0837932 B1 | 6/2008 |

* cited by examiner

*Primary Examiner* — Dennis H Pedder
(74) *Attorney, Agent, or Firm* — Studebaker & Brackett PC

(57) ABSTRACT

A structure of a fuel filler door for a vehicle includes a door hinge having one end portion coupled to a vehicle body, a support unit including a support plate coupled to an opposite end portion of the door hinge and a sidewall protruding from an edge of the support plate, and a cover plate coupled to an upper portion of the sidewall. A first locking step and a second locking step protrude from the sidewall positioned at opposite end portions of the support plate, and a locking member, which is rotatably locked to the first locking step, and a first hook member, which is fixedly locked to the second locking step, protrude from an inner surface of the cover plate.

8 Claims, 7 Drawing Sheets

STRUCTURE OF FUEL FILLER DOOR FOR VEHICLE

CROSS-REFERENCE TO RELATED APPLICATIONS

A claim for priority under 35 U.S.C. § 119 is made to Korean Patent Application No. 10-2018-0013832 filed Feb. 5, 2018 in the Korean Intellectual Property Office, the entire content of which is hereby incorporated by reference.

BACKGROUND

Embodiments of the inventive concept described herein relate to structures of fuel filler doors for vehicles, and more particularly, relate to structures of fuel filler doors for vehicles, capable of improving the endurance of the fuel filler door as the fuel filler door is provided in a dual structure and of simply and strongly coupling the fuel filler door having the simple dual structure.

In general, a fuel filler is formed at one side of a vehicle to inject fuel necessary for the driving of the vehicle, and is doubly blocked.

In other words, the fuel filler is doubly blocked by using a cap directly covering the fuel filler, which is to inject fuel, and a door to maintain the outer appearance of the vehicle beautiful by hiding the cap from the outside. Accordingly, the fuel filler is configured allowing a user to open or close the cap by opening the door only when injecting fuel.

Conventionally, a typical fuel filler door includes, as illustrated in FIG. 1, a door body part 10 having one end including a hinge part 20 rotatably coupled to a vehicle body, a spring 3 being provided at the hinge part 20. The fuel filler door is provided at an opposite end thereof with a hook part 30 protruding to maintain the door in a closed state as the door is locked to a door locking member 2, which is actuated by the operation of an opening/closing handle, which is mounted inside the vehicle.

However, as the conventional fuel filler door having the above-described configuration having a simple plate shape, the fuel filler door is not only weak for an impact, but has a weak supporting force between the vehicle body and the door body part 10. Accordingly, when the fuel filler door is used for a long time, the door body part 10 may be deformed.

In addition, when the door body part 10 is deformed, as the gap between the vehicle body and the door body part 10 is made, noise may be caused during the driving.

SUMMARY

Embodiments of the inventive concept provide structures of fuel filler doors for vehicles, capable of improving the endurance of the fuel filler door as the fuel filler door is provided in a dual structure, and of simply and strongly coupling the fuel filler door having the simple dual structure.

Embodiments of the inventive concept provide structures of fuel filler doors for vehicles, capable of strongly maintaining the coupling state of a cover plate coupled onto a support unit in a strong coupling state without being shaken, due to the coupling structure between the support unit and the cover plate, even if external force is applied to the fuel filler doors in a left-right direction or an up-down direction.

According to an aspect of an embodiment, a structure of a fuel filler door for a vehicle, includes a door hinge having one end portion coupled to a vehicle body, a support unit including a support plate coupled to an opposite end portion of the door hinge and a sidewall protruding from an edge of the support plate, and a cover plate coupled to an upper portion of the sidewall, in which a first locking step and a second locking step protrude from the sidewall positioned at opposite end portions of the support plate, and a locking member, which is rotatably locked to the first locking step, and a first hook member, which is fixedly locked to the second locking step, protrude from an inner surface of the cover plate.

In addition, a tool insertion hole is formed in a portion, which is positioned under the second locking step, of the sidewall.

Further, a fixing mount having a locking hole protrudes from an inner surface of the support plate, and a second hook member, which includes a second locking protrusion locked to the locking hole, protrudes from the inner surface of the cover plate.

In this case, a plurality of fixing mounts and a plurality of second hook members are formed in a plurality of rows and a plurality of columns, and second locking protrusions of the second hook members arranged in adjacent rows are locked to locking holes of the fixing mounts in mutually different directions.

In addition, a reinforcement member is provided at a side opposite to a side of the second hook member, from which the second locking protrusion protrudes.

Further, a guide member, which is guided and supported by the sidewall of the support unit, protrudes from the inner surface of the cover plate.

In addition, a tapered surface is formed on the sidewall to guide insertion of the guide member.

Meanwhile, a bending part is formed at an end portion of the locking member, and a first locking protrusion having an inclined surface with a height lowered downward protrudes from the first hook member.

As described above, according to the inventive concept, the endurance of the fuel filler door provided in the double structure may be improved and the fuel filler door having the simple dual structure may be simply and strongly coupled.

In addition, according to the inventive concept, as the first locking step and the second locking step are coupled to the locking member and the first hook member, the cover plate may be prevented from being shaken by external force applied in a left-right direction. As the fixing mount is coupled to the second hook member, the cover plate may be prevented from being shaken by external force applied in the up-down direction.

In addition, according to the inventive concept, the guide member protruding from the cover plate may not only easily specify the coupling position of the cover plate, but more strongly support the coupling between the support unit and the coupling plate.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
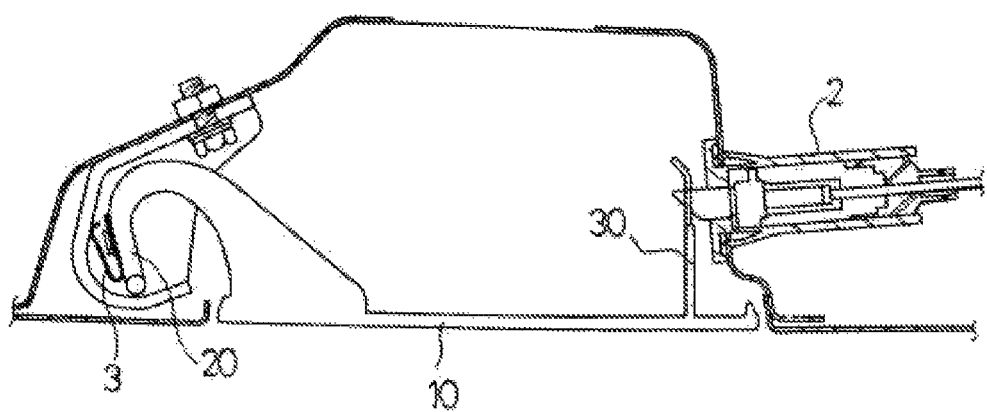
FIG. 1 is a cross-sectional view schematically illustrating the mounting state of the conventional structure of a fuel filler door for a vehicle.

Advantage points and features of the inventive concept and a method of accomplishing thereof will become apparent from the following description with reference to the following figures, wherein embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the inventive concept to those skilled in the art. The inventive concept may be defined by scope of the claims. Meanwhile, the terminology used herein to describe embodiments of the inventive concept is not intended to limit the scope of the inventive concept.

The terminology used in the inventive concept is provided for the illustrative purpose, but the inventive concept is not limited thereto. As used herein, the singular terms "a," "an" and "the" are intended to include the plural forms as well, unless the context clearly indicates otherwise. Furthermore, it will be further understood that the terms "comprises", "comprising," "includes" and/or "including", when used herein, specify the presence of stated elements, steps, operations, and/or devices, but do not preclude the presence or addition of one or more other components, steps, operations and/or devices. The same reference numerals will be assigned to the same component throughout the whole specification, and "and/or" refers to that components described include not only individual components, but at least one combination of the components. It will be understood that, although the terms "first", "second", etc., may be used herein to describe various components, these components should not be limited by these terms. These terms are only used to distinguish one component from another component. Thus, a first component to be described below may be a second component without departing from the teachings of the inventive concept.

Unless otherwise defined, all terms (including technical and scientific terms) used herein have the same meaning as commonly understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a fuel filler door for a vehicle according to exemplary embodiments of the inventive concept will be described in detail with reference to accompanying drawings.

Figure 2:
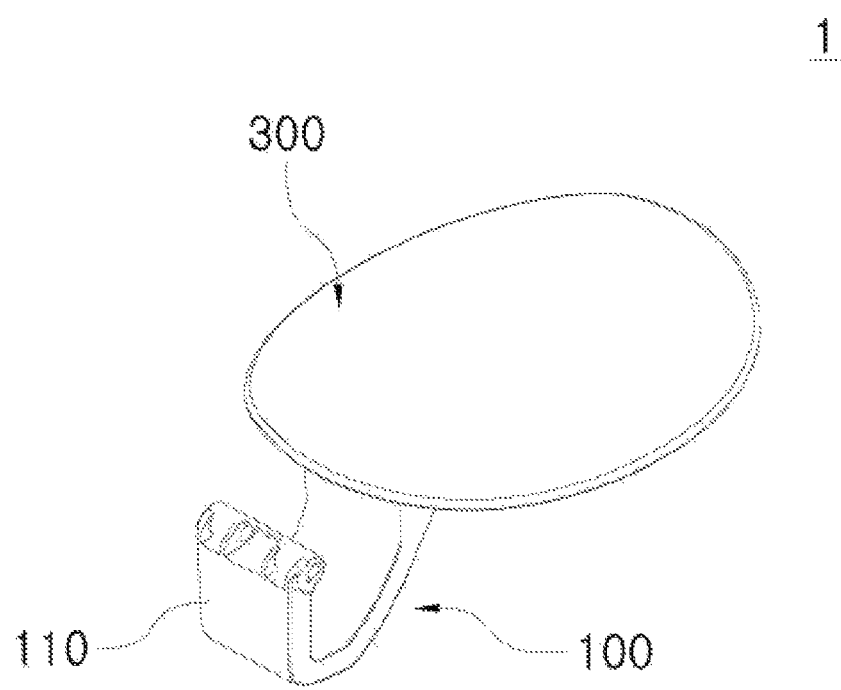
FIG. 2 is a perspective view illustrating the structure of a fuel filler door for a vehicle, according to an inventive concept.
Figure 3:
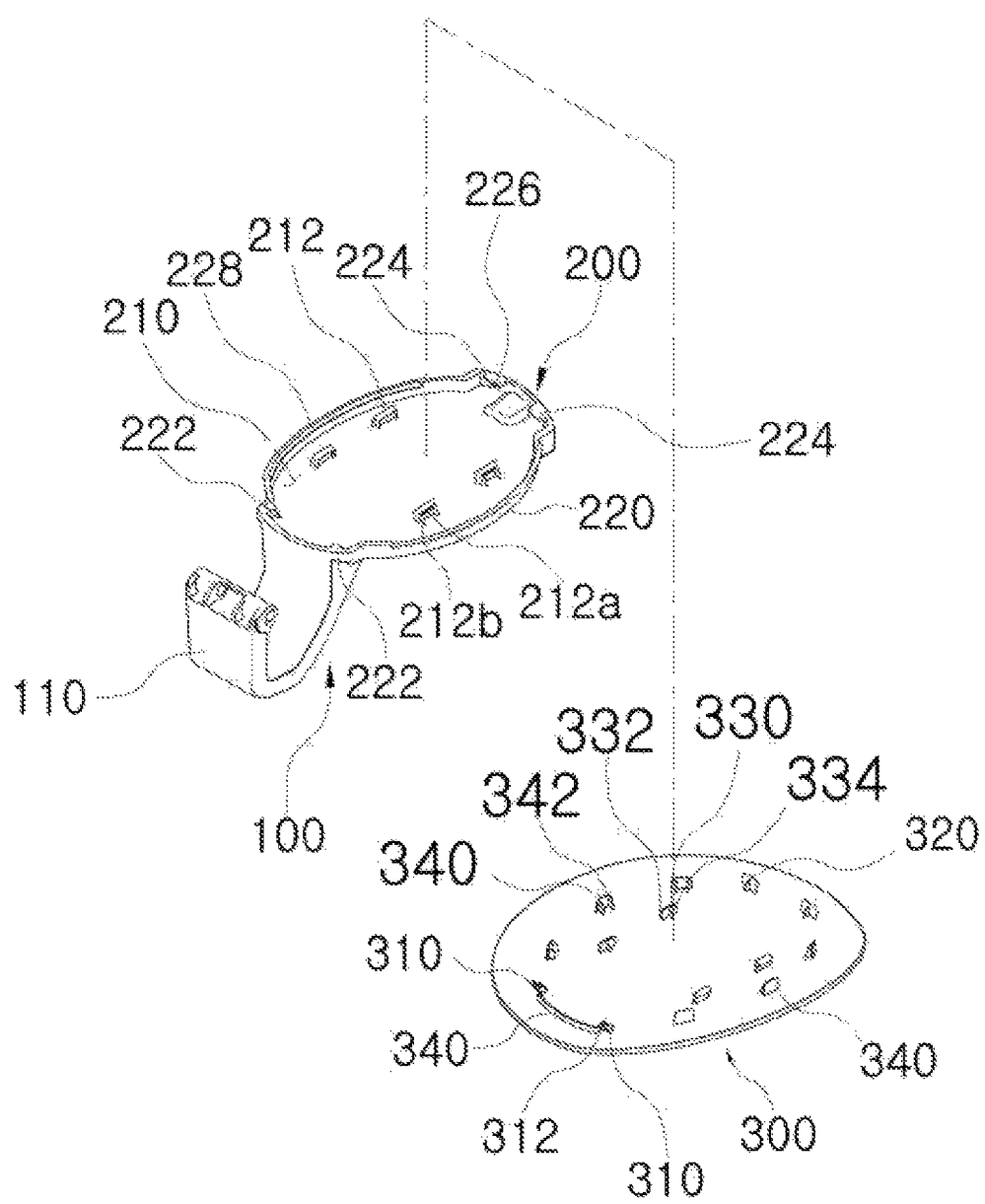
FIG. 3 is an exploded perspective view of FIG. 2.
Figure 4:
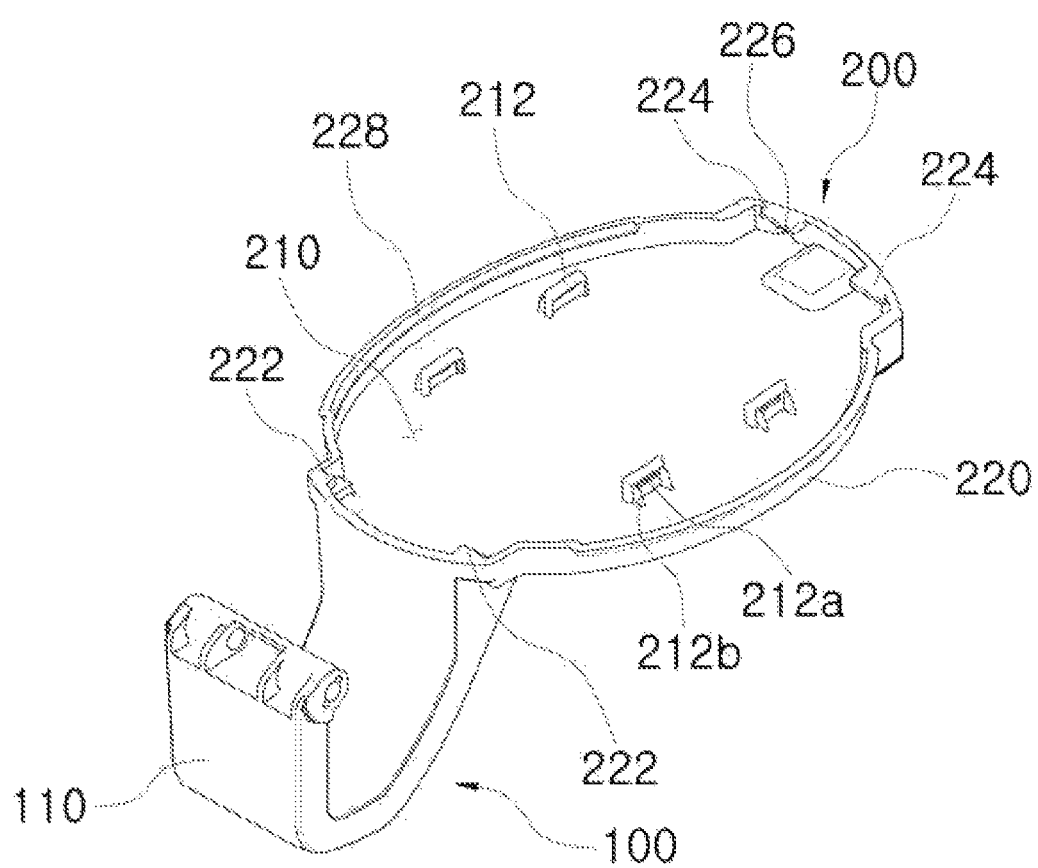
FIG. 4 is a perspective view of a door hinge and a support unit of FIG. 3.
Figure 5:
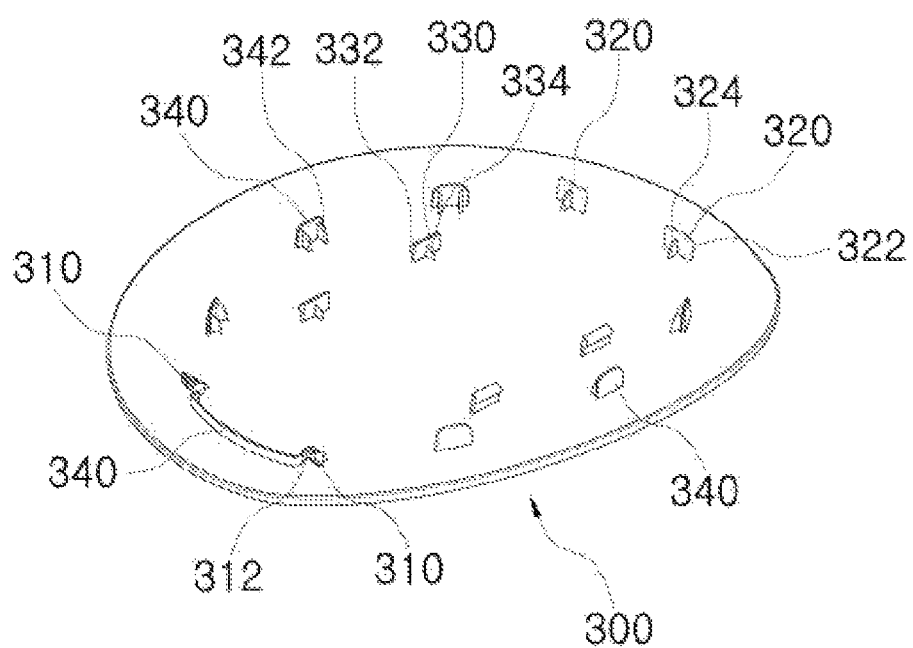
FIG. 5 is a perspective view illustrating the back surface of a cover plate of FIG. 3.
Figure 6:
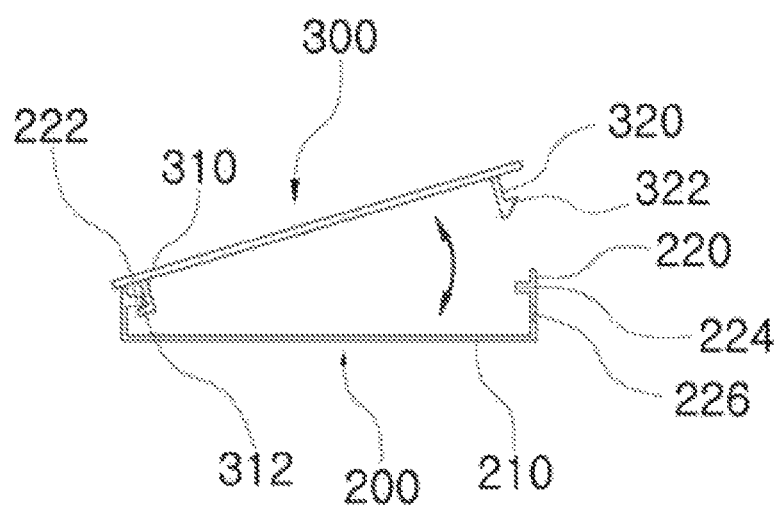
FIG. 6 is a sectional view schematically illustrating that the support unit and a cover plate of FIG. 3 are coupled to each other.
Figure 7:
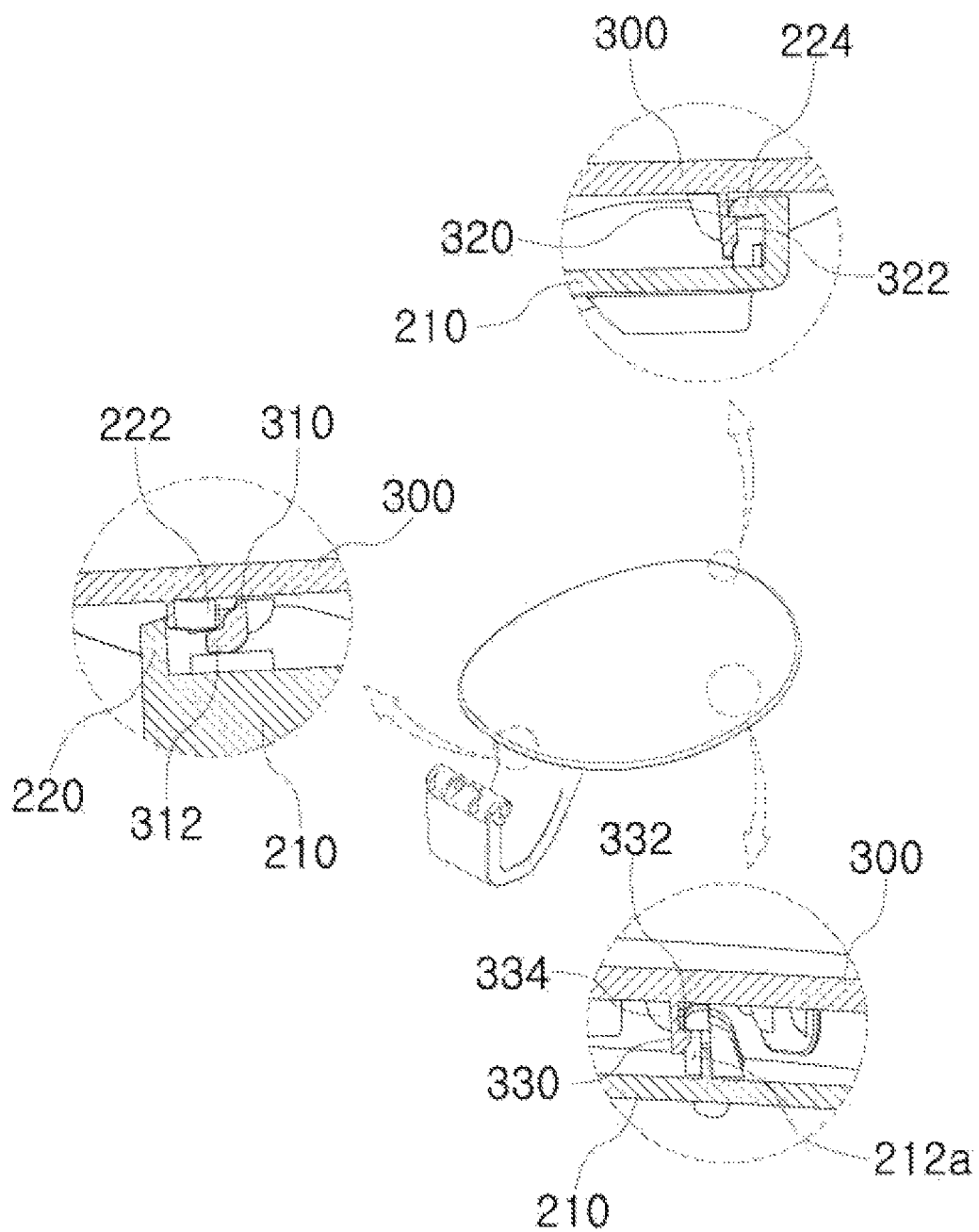
FIG. 7 is a sectional view illustrating the detailed coupling relationship between the support unit and the cover plate.

FIG. 2 is a perspective view illustrating the structure of a fuel filler door for a vehicle, according to an inventive concept, FIG. 3 is an exploded perspective view of FIG. 2, and FIG. 4 is a perspective view of a door hinge and a support unit of FIG. 3. FIG. 5 is a perspective view illustrating the back surface of a cover plate of FIG. 3, FIG. 6 is a sectional view schematically illustrating that the support unit and a cover plate of FIG. 3 are coupled to each other, and FIG. 7 is a sectional view illustrating the detailed coupling relationship between the support unit and the cover plate.

The inventive concept relates to the structure of a fuel filler door for a vehicle, capable of improving the endurance of the fuel filler door as the fuel filler door is provided in a dual structure and of simply and strongly coupling the fuel filler door having the dual structure. The structure of the fuel filler door mainly includes a door hinge 100, a support unit 200, and a cover plate 300, as illustrated in FIGS. 2 and 3.

First, the door hinge 100 has one end portion hinged with a vehicle body such that a fuel filler door 1 (hereinafter, referred to as "door 1") rotates about a hinge coupling part 110, thereby allowing the door 1 to open or close in a hinged type. The detailed feature of the door hinge 100 is the same as that of a door hinge provided in a conventional door structure, so the details thereof will be omitted in the following description.

Next, the support unit 200 is coupled to an opposite end portion of the door hinge 100 such that the door 1 is open or closed as the door hinge 100 rotates, and is coupled to the cover plate 300, which is to be described below, to support the cover plate 300. The support unit 200 includes a support plate 210 and a sidewall 220.

In more detail, the support plate 210 is coupled to the opposite end portion of the door hinge 100 to transmit the rotation force of the door hinge 100 to the cover plate 300 while supporting a lower portion of the cover plate 300, that is, an inner surface of the cover plate 300. The sidewall 220 protrudes from the edge of the support plate 210 to allow the cover plate 300 to be coupled to the door hinge 100. In addition, the sidewall 220 is introduced into a door housing (not illustrated) of a vehicle to support the cover plate 300.

In other words, the support plate 210 has a shape corresponding to a shape of an entrance of a door housing formed in the vehicle body and is inserted into the door housing. The sidewall 220 protrudes from the edge of the support plate 210 to face the outside of the door housing and is supported by the entrance of the door housing. In addition, the sidewall 220 may support the inner surface of the cover plate 300 coupled to the upper portion of the sidewall 220.

The cover plate 300 is coupled to an upper portion of the sidewall 220 of the support unit 200 to cover the fuel filler of the vehicle body. The cover plate 300 is formed in a rectangular shape or a circular shape corresponding to the shape of the fuel filler formed in the vehicle body.

Therefore, according to the structure of the fuel filler door for the vehicle of the inventive concept, unlike a conventional door structure to open or close the cover plate 300 simply coupled to the door hinge 100, the inner surface of the cover plate 300 may be supported by the support unit 200 including the support plate 210 and the sidewall 220, thereby improving impact resistance. In addition, the sidewall 220 of the support unit 200 may be supported by the entrance of the fuel filler, that is, the entrance of a door housing formed in the vehicle body, thereby reducing the gap between the vehicle body and the door 1 and preventing the door 1 from being deformed to improve the endurance.

As illustrated in FIGS. 4 and 5, for the coupling between the support unit 200 and the cover plate 300, at least one first locking step 222 and at least one second locking step 224 protrude from the sidewall 220 protruding from opposite end portions, which are positioned in a widthwise direction, of the support plate 210, and a locking member 310 and a first hook member 320 are formed to protrude from an inner surface of the cover plate 300 and locked to the first and second locking steps 222 and 224.

In other words, as illustrated in FIG. 6, the locking member 310 is formed at the end portion thereof with a bending part 312. Accordingly, when the cover plate 300 is coupled onto the support unit 200, the bending part 312 is rotatably locked to the lower portion of the first locking step 222. In addition, the first hook member 320 includes a first locking protrusion 322 having an inclined surface with the height lowered downward. Accordingly, when the cover plate 300 is coupled onto the support unit 200, the first locking protrusion 322 is fixedly locked to the lower portion of the second locking step 224.

Accordingly, the cover plate 300 is inclined to one side such that the bending part 312 of the locking member 310 is locked to the lower portion of the first locking step 222 formed on the sidewall 220. In this state, when the cover plate 300 is pivoted down, the second locking step 224 formed on the sidewall 220 presses the inclined surface of the first locking protrusion 322 to slightly push inward the first hook member 320 due to elasticity such that the first locking protrusion 322 enters the lower portion of the second locking step 224. In addition, after the first locking protrusion 322 enters the lower portion of the second locking step 224, the first hook member 320 returns to the original position thereof due to elasticity such that the first locking protrusion 322 is locked to the second locking step 224. Accordingly, the cover plate 300 is fixedly mounted on the sidewall 220.

In this case, the locking member 310 and the first hook member 320 are locked to the first locking step 222 and the second locking step 224, respectively, outward from the inside of the sidewall 220. Accordingly, even if the cover plate 300 coupled to an upper portion of the sidewall 220 receives a load in a side direction, the cover plate 300 may be maintained in the strong coupling state without deviating from the sidewall 220.

Meanwhile, a tool insertion hole 226 is formed in a portion, which is positioned under the second locking step 224, of the sidewall 220 to allow a user to separate the cover plate 300, which is locked onto the sidewall 220, from the sidewall 220 by using a tool.

In other words, as described above, both the locking member 310 and the first hook member 320 formed on the cover plate 300 are locked to the first locking step 222 and the second locking step 224, respectively, outward from the inside of the sidewall 220. Accordingly, even if force is applied to the cover plate 300 in one direction, the cover plate 300 may not be separated from the support unit 200. Accordingly, the user may separate the cover plate 300 from the support unit 200 by inserting a tool into the tool insertion hole 226 formed in the sidewall 220 to inward push the end portion of the first hook member 320, thereby allowing the first locking protrusion 322 formed on the first hook member 320 to be out of the second locking step 224.

A fixing mount 212 is formed to protrude from the inner surface of the support plate 210, and a second hook member 330 is formed to protrude from the inner surface of the cover plate 300 to be locked to the fixing mount 212. The fixing mount 212 and the second hook member 330 more strengthen the coupling force between the support unit 200 and the cover plate 300 and prevent the cover plate 300, which is fixedly mounted on the sidewall 220 of the support unit 200, from being shaken by external force, such as vibration or an impact, applied in an up-down direction during the driving of the vehicle.

In more detail, the fixing mount 212 is formed to protrude in the widthwise direction from the inner surface of the support plate 210 or fixed on the inner surface of the support plate 210 as illustrated in FIG. 4. The fixing mount 212 has a locking hole 212a formed through the fixing mount 212 and locked to the second hook member 330.

In addition, the second hook member 330 is formed to protrude from the inner surface of the cover plate 300 or fixed to the inner surface of the cover plate 300, corresponding to the mounting position of the fixing mount 212. The second hook member 330 has a second locking protrusion 332 which is formed to protrude toward one side from the second hook member 330 and locked to the locking hole 212a formed in the fixing mount 212.

In this case, the second locking protrusion 332 has an inclined surface similarly to the first locking protrusion 322 described above. Accordingly, when the cover plate 300 is coupled to an upper portion of the sidewall 220 of the support unit 200, the second hook member 330 is slightly pushed rearward by the pressure applied to the inclined surface of the second locking protrusion 332 by the fixing mount 212 and an upper end portion of the second locking protrusion 332 is positioned in the locking hole 212a formed in the fixing mount 212. In this case, the second hook member 330 returns forward due to elasticity while the second locking protrusion 332 is locked to the inside of the locking hole 212a.

Meanwhile, a plurality of fixing mounts 212 and a plurality of second hook members 330 are provided on the inner surfaces of the support plate 210 and the cover plate 300, respectively, to be arranged in a plurality of rows and columns. The second hook members 330 arranged in adjacent rows are provided in opposite directions such that the second locking protrusions 332 included in the second hook members 330 are locked to the locking holes 212a of the fixing mounts 212 in mutually different directions.

In other words, as illustrated in FIGS. 4 and 5, when the fixing mounts 212 are provided in two rows and the second hook members 330 are provided in two rows, the second locking protrusion 332 of the second hook member 330 provided in the first row and the second locking protrusion 332 of the second hook member 330 provided in the second row protrude in mutually different directions. Accordingly, when the second locking protrusion 332 of the second hook member 330 provided in the first row is locked to the locking hole 212a of the fixing mount 212 to face outward from the center of the cover plate 300, the second locking protrusion 332 of the second hook member 330 provided in the second row is locked to the locking hole 212a of the fixing mount 212 to face outward from the center of the cover plate 300. Accordingly, even if external force is applied to the cover plate 300 or the support unit 200 in the up-down direction, the coupling state between the fixing mount 212 and the second hook member 330 may be strongly maintained.

In this case, although not illustrated, even if the fixing mounts 212 and the second hook members 330 are formed in at least three rows, the second hook members 330 may be provided in adjacent rows in such a manner of facing opposite directions.

Meanwhile, the second hook member 330 may further include a reinforcement member 334. The reinforcement member 334 is mounted at a side opposite to the side of the second hook member 330, from which the second locking protrusion 332 protrudes, to support the second hook member 330. Accordingly, the reinforcement member 334 reinforces the second hook member 330 to prevent the second hook member 330 from being deformed or broken by the load applied from the outside.

In other words, when the second locking protrusion 332 is formed to protrude in one direction of the second hook member 330, the reinforcement member 334 is formed to protrude in an opposite direction of the second hook member 330 to be coupled between the second hook member 330 and the support plate 210, thereby reinforcing the second hook member 330.

In this case, as illustrated in FIGS. 4 and 5, reinforcement members may be formed on the fixing mount 212 formed on the support unit 200, the first hook member 320 provided on the cover plate 300, and a guide member 340 to be described below, in addition to the second hook member 330. Reinforcement members 212b, 324, and 342, which are respectively formed on the fixing mount 212, the first hook member 320, and the guide member 340, are coupled and mounted between one surface of the fixing mount 212 and the support plate 210, and between one surfaces of the first hook member 320 and the guide member 340 and the cover plate 300 to reinforce the fixing mount 212, the first hook member 320, and the guide member 340.

A plurality of guide members 340 protrude from the inner surface of the cover plate 300 while spacing the upper portion of the inner surface of the cover plate 300 from the lower portion of the inner surface of the cover plate 300 by a specific distance. Accordingly, when the cover plate 300 is mounted on the sidewall 220 of the support unit 200, the guide members 340 guide the cover plate 300 to be mounted at a right position, and support the cover plate 300 such that the cover plate 300 mounted on the sidewall 220 is maintained in a strongly fixed state.

In this case, regarding the sidewall 220 of the support unit 200, into which the guide member 340 is inserted, a tapered surface 228 is formed from an upper end portion of the sidewall 220 by a specific depth, with a slope inclined downward from the upper end portion of the sidewall 220, thereby guiding the insertion the guide member 340.

In more detail, the cover plate 300 is coupled to an upper portion of the sidewall 220 as an opposite side of the cover plate 300 is pivoted down in the state that the locking member 310 formed at one side of the cover plate 300 is locked to the first locking step 222 protruding from the sidewall 220 as described above. To fixedly mount the cover plate 300, the first hook member 320 has to be locked to the second locking step 224 protruding from the sidewall 220 and all the second hook members 330 provided on the cover plate 300 have to be exactly locked to the fixing mounts 212 provided on the support plate 210. Accordingly, the position of the cover plate 300 coupled to an upper portion of the sidewall 220 has to be exactly specified.

Accordingly, as illustrated in FIG. 7, when the cover plate 300 is fixedly mounted onto the sidewall 220, the guide member 340 protruding from the inner surface of the cover plate 300 is guided by the sidewall 220 of the support unit 200 to make close contact with the inner surface of the sidewall 220, thereby specifying the position of the cover plate 300.

In addition, the specification of the position of the cover plate 300 by the guide member 340 may be more easily performed due to the tapered surface 228 formed on the sidewall 220. The guide member 340 is supported to the inner surface of the sidewall 220 positioned under the tapered surface 228 in the state the cover plate 300 is completely coupled. Accordingly, the cover plate 300 may be prevented from being shaken and the coupling force between the cover plate 300 and the support unit 200 may be more strongly supported.

Therefore, as described above, according to the structure of the fuel filler door for the vehicle of the inventive concept, the endurance of the fuel filler door 1 provided in the double structure may be improved and the fuel filler door 1 having the simple dual structure may be simply and strongly coupled. As the first locking step 222 and the second locking step 224 are coupled to the locking member 310 and the first hook member 320, the cover plate 300 may be prevented from being shaken by external force applied in a left-right direction. As the fixing mount 212 is coupled to the second hook member 330, the cover plate 300 may be prevented from being shaken by external force applied in the up-down direction. The guide member 340 protruding from the cover plate 300 may not only easily specify the coupling position of the cover plate 300, but more strongly support the coupling between the support unit 200 and the coupling plate 300.

Although the above-described embodiments have been described as exemplary embodiments of the inventive concept, the inventive concept is not limited thereto. It could be apparent to those skilled in the art that components provided in the support plate 210 and the cover plate 300 may be formed integrally with each other or separately from each other and fixed to each other, and the fixing mount 212 and second hook members 330 coupled to fixing mounts 212 are mounted in a lengthwise direction, or in the combination of widthwise, lengthwise, and diagonal directions, that is, various modifications are possible within the scope of the inventive concept.

The inventive concept relates to a structure of a fuel filler door for a vehicle, and more particularly, relate to a structure of a fuel filler door for a vehicle, capable of improving the endurance of the fuel filler door as the fuel filler door is provided in a dual structure, and of simply and strongly coupling the fuel filler door having the simple dual structure.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A structure of a fuel filler door for a vehicle, the structure comprising:
   a door hinge having one end portion coupled to a vehicle body;
   a support unit including a support plate coupled to an opposite end portion of the door hinge and a sidewall protruding from an edge of the support plate; and
   a cover plate coupled to an upper portion of the sidewall,
   wherein a first locking step and a second locking step protrude from the sidewall positioned at opposite end portions of the support plate, and
   wherein a locking member, which is rotatably locked to the first locking step, and a first hook member, which is fixedly locked to the second locking step, protrude from an inner surface of the cover plate.

2. The structure of claim 1, wherein a tool insertion hole is formed in a portion, which is positioned under the second locking step, of the sidewall.

3. The structure of claim 1, wherein a fixing mount having a locking hole protrudes from an inner surface of the support plate, and wherein a second hook member, which includes a second locking protrusion locked to the locking hole, protrudes from the inner surface of the cover plate.

4. The structure of claim 3, wherein a plurality of fixing mounts and a plurality of second hook members are formed in a plurality of rows and a plurality of columns, and wherein second locking protrusions of the second hook members arranged in adjacent rows are locked to locking holes of the fixing mounts in mutually different directions.

5. The structure of claim 3, wherein a reinforcement member is provided at a side opposite to a side of the second hook member, from which the second locking protrusion protrudes.

6. The structure of claim 1, wherein a guide member, which is guided and supported by the sidewall of the support unit, protrudes from the inner surface of the cover plate.

7. The structure of claim 6, wherein a tapered surface is formed on the sidewall to guide insertion of the guide member.

8. The structure of claim 1, wherein a bending part is formed at an end portion of the locking member, and wherein a first locking protrusion having an inclined surface with a height lowered downward protrudes from the first hook member.

* * * * *